1,581,732

UNITED STATES PATENT OFFICE.

AARON M. HAGEMAN, OF BLOOMFIELD, AND EDWARD R. SCHMID, OF VERONA, NEW JERSEY, ASSIGNORS TO WESTINGHOUSE LAMP COMPANY, A CORPORATION OF PENNSYLVANIA.

PAINT AND PROCESS OF APPLYING THE SAME.

No Drawing. Application filed December 18, 1920. Serial No. 431,587.

*To all whom it may concern:*

Be it known that we, AARON M. HAGEMAN, a citizen of the United States, and a resident of Bloomfield, in the county of Essex and State of New Jersey, and EDWARD R. SCHMID, a citizen of the United States, and a resident of Verona, in the county of Essex and State of New Jersey, have invented a new and useful Improvement in Paints and Processes of Applying the Same, of which the following is a specification.

This invention relates to the coating or painting of a transparent substance, such as glass, and particularly to the coating of an incandescent lamp bulb.

An object of the invention is the provision of a method for coating glass and other transparent objects with a paint which is resistant to heat, water, constituents of the atmosphere, etc.

Another object of the invention is the providing of a process for applying a pigment to transparent objects in such manner that the original color of the pigment is not changed during the process, which occurs in some processes where a chemical reaction is made to take place in the paint.

A further object of the invention is the provision of a process for imparting to glass or like substance, a coating of uniform thickness, free from spots and unattended by subsequent scaling.

A still further object of the invention is the provision of a binding material for a paint which renders the same resistant to heat, water or its vapor, etc.

Other objects of the invention will manifest themselves upon a reading of the following description.

The present processes for coating glass, which is to be exposed to outside weather conditions or considerable heat, are defective in that the coating either peels, changes color, volatilizes or blisters. Some of the present processes give a coating of varying thickness which is a defect if the glass or other transparent substance is to be used to transmit light.

In practicing the invention, a solution of sodium silicate is mixed with another compound which, at an elevated temperature, will render the sodium silicate resistant to water and certain constituents of the atmosphere.

Sodium silicate is a substance well known as a binding agent for powdered materials. To render it sufficiently adhesive, it is made as having a ratio of acid to base, i. e., of silica ($SiO_2$) to sodium oxide ($Na_2O$), greater than unity, but with a sufficient proportion of base or alkali to render it sufficiently soluble. The solubility which is necessary in order to mix a pigment with the sodium silicate and apply the paint is a disadvantage if the painted object is to be exposed to water or water vapor. To make the sodium silicate resistant to the solvent action of water, it is necessary to reduce its alkali content. The present invention does this by adding to the sodium silicate a sufficient amount of a chemical compound which will react with the sodium silicate to reduce the alkali content of the latter substance until it reaches a composition of minimum aqueous solubility.

It is also necessary to reduce the proportion of alkali in the sodium silicate on account of the fact that the alkali will absorb from the air such substances as moisture, carbon dioxide and sulphur dioxide, forming soluble salts such as sodium carbonate and other soluble sodium salts. The soluble salts tend to accumulate as a residue on the painted surface and present an objectionable appearance.

A mixture, which may be used to paint glass or other material, may consist of a pigment, a solution of sodium silicate to which is added any water-soluble compound the solution of which is miscible with the solution of sodium silicate at ordinary temperature and will react chemically with the sodium silicate at an elevated or higher than room temperature to reduce the alkali content of the sodium silicate. The substances added to the sodium silicate may be, for example, ammonium oxalate, ammonium sulphate, sodium ammonium phosphate, or oxalic acid. For the purpose of describing the process, oxalic acid may be assumed as the substance added to the sodium silicate. To the mixture of sodium silicate and oxalic acid the pigment of the desired color is added in the form of an impalpable powder which is thoroughly distributed throughout the aqueous solution.

The paint is then applied by any suitable means but is preferably sprayed on, by means of an air brush, to any desired thickness. By varying the thickness of the coating the color may be varied to different hues. The glass is then exposed to a temperature of from 125° to 200° in an oven for a period of about three minutes. At this temperature, the oxalic acid combines with part of the alkali of the sodium silicate.

A typical formula which has been successfully used to produce the frosted effect on lamp bulbs is the following: 500 cc. sodium silicate solution of 1.4 specific gravity, 400 cc. saturated ammonium oxalate solution, 175 grams kaolin.

The solution obtained by using this formula may be sprayed by an air brush upon an exposed surface of a lamp bulb. The lamp is then placed in an oven in which the temperature is in the neighborhood of 175° C., and baked for a period of about three minutes. This gives a hard uniform coating to the lamp bulb treated according to the process just described.

Modifications of the invention will manifest themselves to those skilled in the art but it is our intention to include such of these as come within the scope of the appended claims.

The term "elevated temperature," as used in the appended claims, is intended to specify a temperature somewhat higher than that of room temperature, i. e., within the range of 125° C. to 200° C.

What we claim is:

1. A binding material for a light diffusing coating consisting essentially of a solution of a mixture of commercial sodium silicate and a substance capable of reducing the alkali content of said sodium silicate when said mixture is heated to render said coating resistant to atmospheric conditions.

2. A binding material for a light transmitting coating which consists essentially of a solution of sodium silicate and a solution of a compound capable of reacting with the sodium silicate at an elevated temperature to render the coating resistant to atmospheric conditions.

3. A binding material for a light transmitting coating consisting essentially of a solution of a mixture of commercial sodium silicate and a substance capable of reducing the free alkali content of said sodium silicate when said mixture is heated.

4. A binding material for a paint comprising a water solution of a mixture of sodium silicate and an organic compound capable of reducing the alkali content of said sodium silicate when said mixture is heated.

5. A binding material for a paint adapted to be applied to transparent objects which consists of a water solution of sodium silicate and ammonium oxalate.

6. A light diffusing paint consisting essentially of a pigment, a solution of sodium silicate and a compound capable of reacting with the sodium silicate at an elevated temperature to render said paint less soluble.

7. A paint consisting of a pigment and a water solution of sodium silicate and ammonium oxalate.

8. The process of coating a vitreous object which consists in applying thereto, a pigment, a solution of sodium silicate and a solution of a substance capable of chemically reacting with the sodium silicate and heating the coated object, whereby the paint is rendered resistant to the action of heat, water and impurities of the atmosphere.

9. The process of applying a translucent coating of paint to an incandescent electric lamp which consists in applying, as a paint, a pigment, a solution of sodium silicate and a solution of a substance capable of chemically reacting with the sodium silicate when heated.

10. The method of rendering resistant to the solvent action of water a paint having sodium silicate as a binder which consists in heating the paint with a suitable material to reduce the alkali content of the sodium silicate after the paint has been applied.

11. The method of rendering resistant to the solvent action of water a paint which comprises mixing a pigment with a solution of sodium silicate and a compound capable of chemically reacting with sodium silicate when heated, and heating said paint whereby a part of the alkali is removed from the sodium silicate by the chemical reaction initiated by the heating.

12. The process of frosting clear glass which consists in applying, as a paint, a white pigment held in suspension by a solution of sodium silicate, mixing this solution with a solution of a substance capable of chemically reacting with the sodium silicate and heating the glass to an elevated temperature.

In testimony whereof, we have hereunto subscribed our names this 17th day of December, 1920.

AARON M. HAGEMAN.
EDWARD R. SCHMID.